Aug. 9, 1938.  L. M. EZELL  2,126,100
FOOD CUTTER
Filed Aug. 13, 1937  2 Sheets-Sheet 1
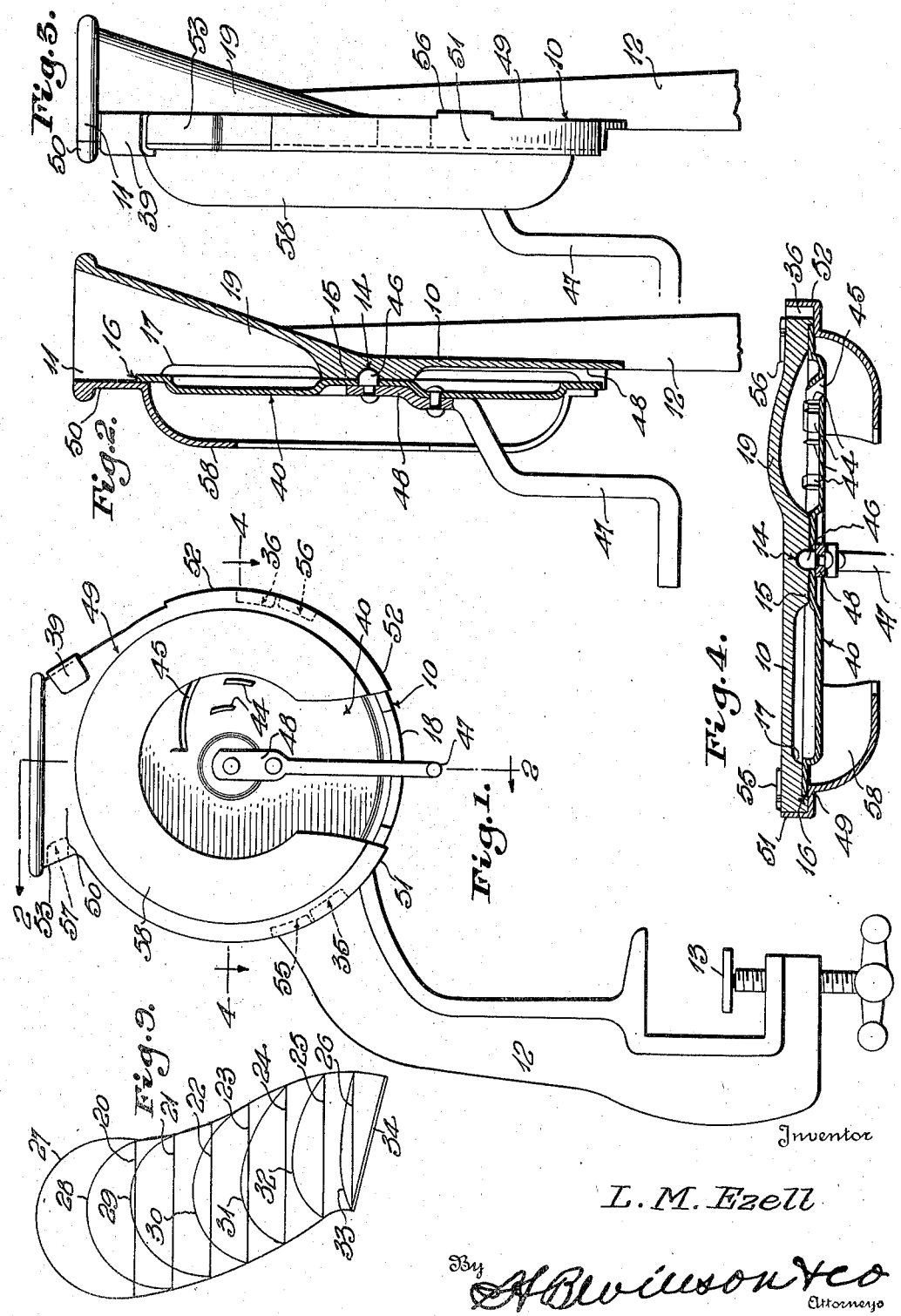
Inventor
L. M. Ezell
By H. B. Wilson & Co
Attorneys Aug. 9, 1938.        L. M. EZELL        2,126,100
FOOD CUTTER
Filed Aug. 13, 1937        2 Sheets-Sheet 2
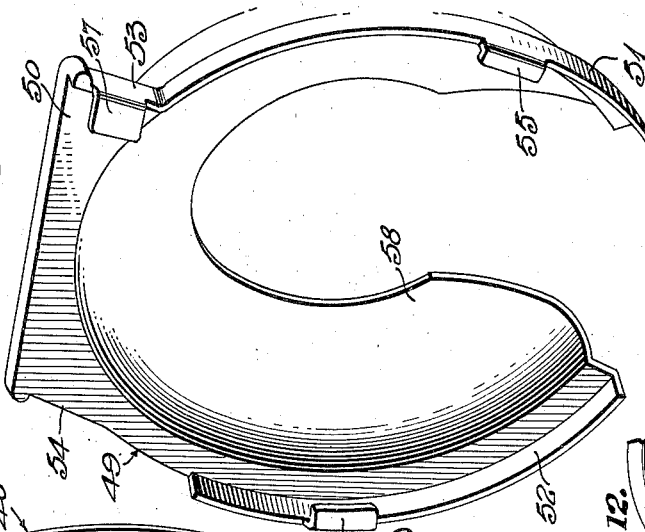
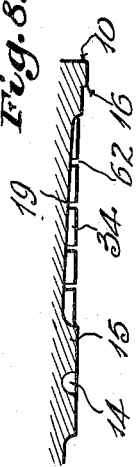
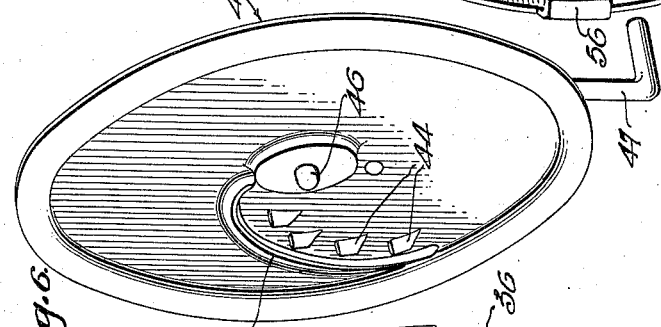
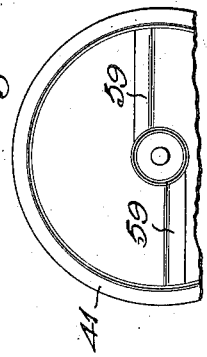
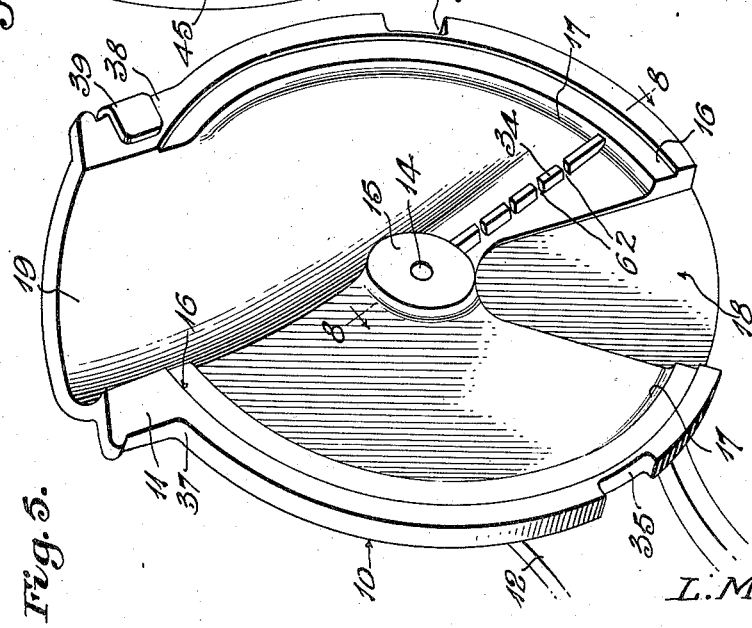
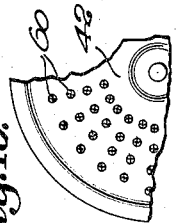
Inventor
L. M Ezell
By H. B. Willson &co
Attorneys Patented Aug. 9, 1938

2,126,100

UNITED STATES PATENT OFFICE 2,126,100

FOOD CUTTER

Lemuel Mims Ezell, Nashville, Tenn.

Application August 13, 1937, Serial No. 158,995

3 Claims. (Cl. 146—114)

The invention aims to provide an exceptionally simple and inexpensive, yet an efficient, easily operated and easily cleaned food cutter for domestic purposes.

With the foregoing in view, the invention resides in the novel subject matter hereinafter described and claimed, description being accomplished by reference to the accompanying drawings.

Fig. 1 is a side elevation of a food cutter constructed in accordance with the invention.

Fig. 2 is a vertical sectional view on line 2—2 of Fig. 1.

Fig. 3 is an edge view.

Fig. 4 is a horizontal sectional view on line 4—4 of Fig. 1.

Figs. 5, 6 and 7 are perspective views of disassembled parts.

Fig. 8 is a detail sectional view on line 8—8 of Fig. 5.

Fig. 9 is a diagram showing the various cross-sectional curvatures of the hopper.

Figs. 10, 11 and 12 are fragmentary elevations showing different forms of cutting disks.

In the drawings above briefly described, the numeral 10 denotes a stationary plate of substantially circular outline but provided with an upwardly projecting lobe 11, said plate being preferably integrally joined to the upper end of a standard 12 having an appropriate clamp 13 for securing it to a table or the like. At one side of the plate 10, a central bearing socket 14 is provided, preferably formed in a boss 15. This same side of the plate is provided with a rabbet 16 near its peripheral edge, and said side is somewhat concave as shown at 17 between said rabbet 16 and said boss 15. The lower portion of the concave surface 17 is provided with a shallow downwardly opening groove 18 for discharging some of the food when it is being grated. The lobe 11 and a subjacent portion of the plate 10, are laterally bulged to provide a hopper 19 for the food to be cut, said hopper being open at its upper end and opening through the rabbeted side of said plate. The cross-sectional shape of this hopper preferably varies from its upper to its lower end as diagrammatically shown in Fig. 9. In this view, the lines 20 to 26 inclusive and the curved lines 27 to 33 inclusive, connected at their ends with said lines 20 to 26, denote the horizontal cross-sectional shape of the hopper at various elevations. To make this more clear, the lines 20 and 27 show the horizontal cross-sectional shape at the upper end of the hopper, the lines 21 and 28 show said shape a little lower, the lines 22 and 29 illustrate the shape still lower, and so on. By forming the hopper in this preferred way, it offers maximum resistance to turning of the food with any of the various cutting disks which may be used, said disks being hereinafter described.

At the lower end of the hopper 19, a straight cutter bar 34 extends radially from the boss 15 to the rabbet 16, and the hopper wall converges outwardly with the outer edge of this cutter bar, from the inner toward the outer end of the latter. This formation, together with the outward declination of the cutter bar 34, insure that the last fragment of food from the hopper 19 shall be properly presented to the cutting disk.

The peripheral edge portion of the plate 10 is provided with two notches 35 and 36 spaced circumferentially from the edges 37 and 38 of the lobe 11, and the edge 38 is provided with a lateral hooked lug 39, this lug and the notches performing functions hereinafter described.

Only one cutting disk has been shown in its entirety, said disk being denoted at 40, although fragments of other disks 41, 42 and 43 have also been illustrated. For simplification, the description will mention principally the disk 40 but it is to be borne in mind that any of the other disks could be used instead of this particular disk.

The disk 40 is provided with a plurality of short arcuate cutters 44 concentric with the disk axis and is provided with a relatively long arcuate cutter 45 behind and transverse to said cutters 44, all of said cutters being operable across the open side of the hopper 19 and serving to cut the vegetable, fruit or the like into curved narrow strips, for instance, when making fruit or vegetable salads or preparing potatoes for French frying.

The disk 40 is provided with a central bearing stud 46 on one side and with an operating crank 47 on its other side, said crank having an inwardly offset inner end 48 suitably secured to said disk. The bearing stud 46 is seated rotatably in the bearing socket 14 and the peripheral edge of the disk 40 is seated similarly in the rabbet 16, the disk being held in operative position by means now to be described.

An arcuate plate 49 with its ends disposed downwardly, lies against the outer side of the disk 40 at the peripheral portion of the latter and lies also against the surrounding or marginal portion of the plate 10, said plate 49 being provided with an upstanding lobe 50 of substantially the same width as the lobe 11. This plate 49 is provided with two peripheral flanges 51 and 52 which project laterally and engage the peripheral edge of the plate 10. The flange 51 extends from one end of the plate 49 along the peripheral edge of the latter and upwardly along one edge of the lobe 50, the upper portion of this flange being denoted at 53 for later reference. The other flange 52 extends from the other end of the plate 49 along the peripheral edge of the latter and terminates in spaced relation with the edge 54 of the lobe 50. The flanges 51 and 52 are provided with inwardly projecting lugs 55 and 56 respectively, which embrace the peripheral edge portion of the plate 10 near the notches 35 and 36. The flange portion 53 is provided with a similar inwardly directed lug 57 which embraces the edge 37 of the lobe 11, and the edge 54 of the lobe 50 is embraced by the hooked lug 39 of said lobe 11. The parts are thus held operatively assembled with the inner end portion of the crank 47 operable within the arc of the plate 49. When the device is in operation, the rotation of the disk 40 tends to turn the plate 49 in the proper direction to hold it operatively engaged with the plate 10. However, when the plate 49 is turned in the other direction, all of the lugs 55, 56, 57 and 39 will be released, said lugs 55 and 56 being then movable through the notches 35 and 36 permitting entire detachment of the plate 49 and the disk 40.

The inner portion 58 of the plate 49 is preferably bulged outwardly toward its inner edge to receive the food cut by the disk and to downwardly discharge it into a suitable receptacle below.

The disks 41, 42 and 43 are substantially the same as the disk 40 with the following exceptions. Disk 41 is merely provided with two substantially tangential cutters 59 useable for example in making slaw or kraut; disk 42 is provided with sharp tubular teeth 60 for grating nutmeg, dry bread, etc.; and disk 43 is provided with small transversely grooved cutters 61 for shredding. All of the cutters 45, 59, 60 and 61 will clear the stationary cutter bar 34 but the cutters 44 of the disk 40 are preferably longer, and to receive these cutters, said cutter bar 34 may be provided with transverse notches 62.

From the foregoing, taken in connection with the accompanying drawings, it will be seen that an exceptionally simple and inexpensive device has been provided for domestic use in preparing food in any of numerous ways. The device may be quickly and easily assembled with any desired cutting disk in operative position, and the rotation of the disk tends to hold the plate 49 properly engaged with the plate 10. However, by turning said plate 49 to release the various lugs, said plate may be easily removed, allowing removal of the cutting disk. All parts are then readily accessible for easy cleaning.

As excellent results may be obtained from the details disclosed, these details are preferably followed. However, within the scope of the invention as claimed, variations may be made.

I claim:

1. A food cutter comprising a stationary vertically disposed plate of substantially circular outline but provided with an upstanding lobe, said lobe and a subjacent portion of said plate being laterally bulged to provide a hopper which opens through one side of said plate, the peripheral edge of said plate being provided with transverse notches circumferentially spaced from the edges of said lobe, a cutting disk at said one side of said plate and having an operating crank, a removable plate lying against the marginal portion of said one side of said stationary plate and against said disk to hold the latter in operative position, said removable plate being provided with a second upstanding lobe of substantially the same width as the first mentioned lobe, the outer peripheral edge of said removable plate being provided with spaced lugs embracing the peripheral edge of said stationary plate near said notches, one edge of the first mentioned lobe being provided with a lug embracing one edge of said second lobe, the other edge of said second lobe being provided with a lug embracing the other edge of said first mentioned lobe, all of said lugs being releasable by turning said removable plate, the first mentioned lugs being then movable through said notches, allowing entire removal of said removable plate and said disk.

2. A food cutter comprising a stationary vertically disposed plate of substantially circular outline but provided with an upstanding lobe, said lobe and a subjacent portion of said plate being laterally bulged to provide a hopper which opens through one side of said plate, the peripheral edge of said plate being provided with transverse notches circumferentially spaced from the edges of said lobe, a cutting disk at said one side of said plate and having an operating crank, a removable arcuate plate lying against the marginal portion of said one side of said stationary plate and against said disk to hold the latter in operative position, said arcuate plate being provided with a second upstanding lobe of substantially the same width as the first mentioned lobe, the outer peripheral edge of said arcuate plate being provided with two lateral flanges lying against said peripheral edge of said stationary plate, one of said flanges extending from one end of said arcuate plate to said second lobe and along one edge of the latter, the other of said flanges extending from the other end of said arcuate plate to a point spaced from the other edge of said second lobe, said flanges having inwardly directed lugs embracing the peripheral edge portion of said stationary plate near said notches, the upper end of said one of said flanges being provided with an inwardly directed lug embracing one edge of the first mentioned lobe, the other edge of said first mentioned lobe being provided with a hooked lug embracing the other edge of said second lobe, all of said lugs being releasable by turning said arcuate plate, the first mentioned lugs being then movable through said notches, allowing entire removal of said arcuate plate and said disk.

3. A food cutter comprising a stationary vertically disposed plate of substantially circular outline, said stationary plate having a rabbet in one side near its edge, having a central bearing socket opening through said one side, and having a laterally bulged portion providing a hopper which opens through said one side, a cutting disk at said one side of said plate and having its peripheral edge portion seated in said rabbet, one side of said disk being provided with a central bearing stud received removably in said bearing socket, an operating crank disposed to the other side of said disk and secured to the latter, a removable arcuate plate lying against the marginal portion of said other side of said disk and against the surrounding portion of said stationary plate, the inner end portion of said crank being operable within the arc of said removable arcuate plate, and means removably securing said arcuate plate to said stationary plate.

LEMUEL MIMS EZELL.